July 19, 1932.  C. RUEGG  1,867,987

RESILIENT COUPLING

Filed July 20, 1928

Inventor
Clement Ruegg
By Dodge and Ims
Attorneys

Patented July 19, 1932

1,867,987

UNITED STATES PATENT OFFICE

CLEMENT RUEGG, OF MILWAUKEE, WISCONSIN, ASSIGNOR TO NORDBERG MANUFACTURING COMPANY, OF MILWAUKEE, WISCONSIN, A CORPORATION OF WISCONSIN

RESILIENT COUPLING

Application filed July 20, 1928. Serial No. 294,302.

This invention relates to yielding couplings, and particularly to couplings intended for use between two substantially alined shafts and arranged to cushion the drive in both rotary directions.

While not restricted in utility to that field, the invention is peculiarly adapted to use in driving engine governors, to relieve the governor of the effect of minor cyclic speed changes of the engine, both accelerative and decelerative. In this class of service it is essential that failure of the resilient element of the yielding drive shall not destroy the drive to the governor, since stoppage of the governor while the engine is in motion, would probably cause the engine to wreck itself. Special means are provided to ensure maintenance of the drive connection upon failure of the resilient element of the coupling.

The preferred embodiment of the invention as included in a governor drive for a Diesel engine is illustrated in the accompanying drawing, in which,—

Figure 1:
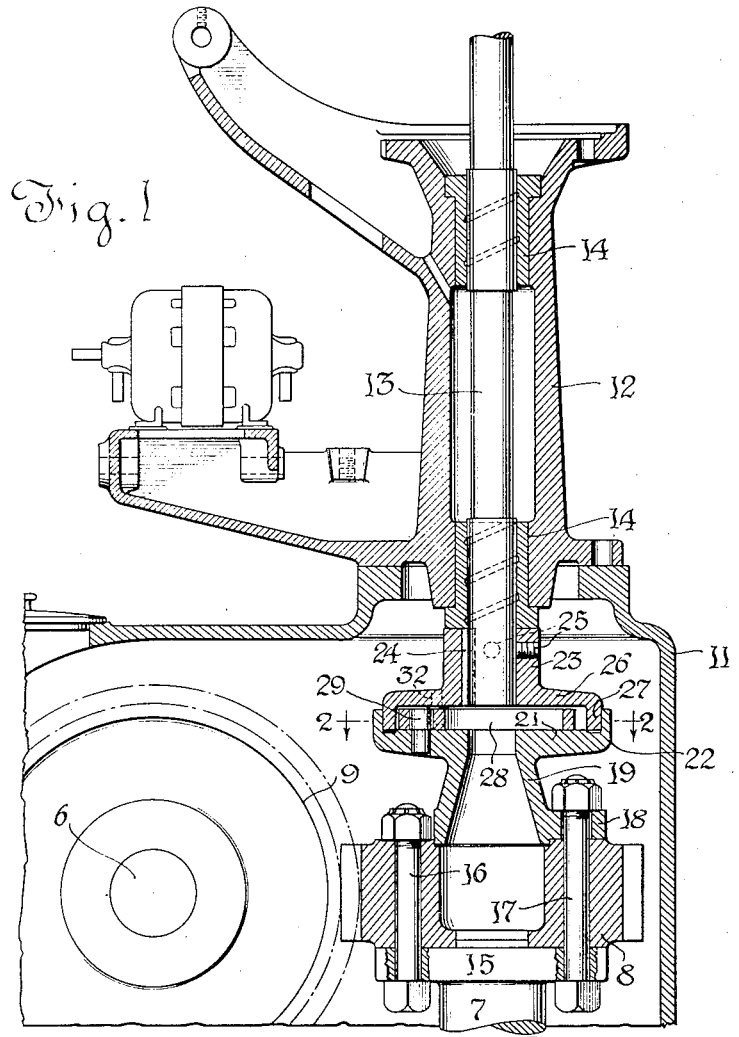
Fig. 1 is a vertical section of a governor drive.
Figure 2:
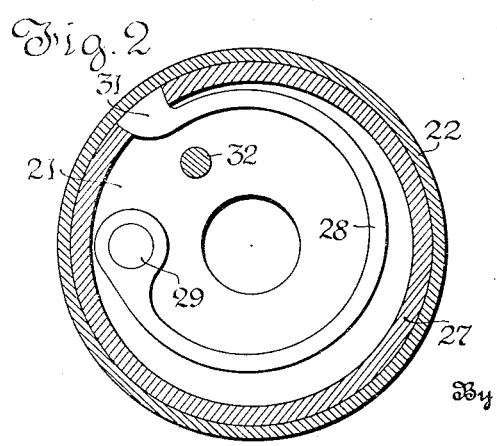
Fig. 2 is a section on the line 2—2 of Fig. 1 on an enlarged scale.
Figure 3:
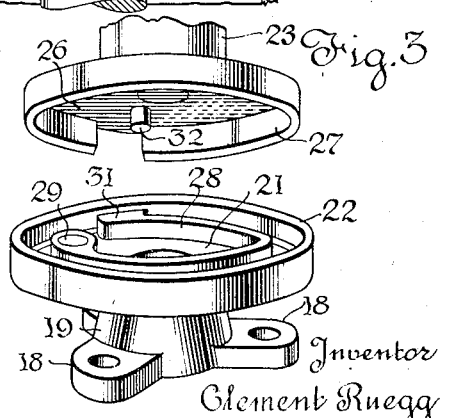
Fig. 3 is a perspective view of the two coupling members separated to show the construction.

In Fig. 1 an ordinary overhead cam shaft is shown at 6. This is driven from the crank shaft (not shown) by a vertical shaft 7 and spiral gears 8 and 9. The gear casing is shown at 11 and the governor frame at 12. The governor shaft 13 turns in bearings 14 in frame 12 and is axially alined with shaft 7.

The gear 8 is fixed to shaft 7 by means of six bolts which pass through the gear and a flange 15 on the upper end of shaft 7. Three of these bolts, one of which appears at 16, pass only through the flange and gear. The other three, one of which appears at 17, pass through the flange and gear and also through a corresponding one of three lugs 18 on the lower end of the tubular hub 19 of the lower coupling element.

The hub 19 carries at its upper end a disc or circular plate 21 having a peripheral flange 22. The lower end of shaft 13 carries the other coupling element, which includes a hub 23 fixed on the shaft by key 24 and set screw 25, a disc or circular plate portion 26 and a peripheral flange 27. The flange 27 turns within flange 22 to enclose a space between the discs 21 and 26 which houses the spring.

This spring is shown at 28 and extends in an arc of some 300° approximately concentric with the axis of rotation. It is connected by a pin 29 with disc 21, the circular pin acting as a journal in the circular eye formed in one end of spring 28. The other end of the spring 28 is formed with a dovetail enlargement 31 which closely fits in a slot formed in flange 27 to receive it.

If spring 28 should fail the part which encircles pin 29 would collide with the end portion adjacent 31. However, to provide for the remote contingency of failure by shear across the dovetail 31, a stop pin 32 is fixed in disc 26. This will prevent relative rotation of the parts even in the complete absence of the spring.

The invention is applicable to other uses than governor drives and may be variously embodied according to attendant circumstances and the preferences of the designer.

What is claimed is,—

1. A resilient coupling comprising two concentric rotary elements and a substantially concentric arcuate spring, subtending an angle less than 360°, rigidly connected adjacent one end to one element and pivoted adjacent the other end directly to the other element on an axis parallel with the axis of the rotary elements.

2. A resilient coupling comprising two concentric rotary elements and a substantially concentric arcuate spring, subtending an angle less than 360°, rigidly connected adjacent one end to one element and pivoted adjacent the other end directly to the other element on an axis parallel with the axis of the rotary elements; and means for positively limiting the relative angular displacement of said elements.

3. A resilient coupling comprising two concentric rotary elements and a substantially concentric arcuate spring, subtending an angle less than 360°, rigidly connected adjacent one end to one element and pivoted adjacent the other end to the other element; and means coacting with a portion of said spring to limit the relative angular displacement of said elements.

4. A resilient coupling comprising two concentric rotary elements having inter-engaging flanges; and an arcuate spring, subtending an angle less than 360°, rigidly connected with the flange of one element and pivoted to the other element.

5. A resilient coupling comprising two concentric rotary elements having inter-engaging concentric flanges; an arcuate spring rigidly connected with the flange of one element and pivoted to the other element; and means adapted to engage an end of said spring to limit the relative angular displacement of said elements.

6. A resilient coupling comprising two concentric rotary elements having inter-engaging concentric flanges which house a space between said elements; and an arcuate spring within said space having one end fixedly engaged in a recess in the flange of one member, and the other end pivoted to the other member within said flanges.

7. A resilient coupling comprising two concentric rotary elements having inter-engaging concentric flanges which house a space between said elements; an arcuate spring within said space having one end fixedly engaged in a recess in the flange of one member, and the other end pivoted to the other member within said flanges; and a lug on the first member in the path of the pivot on the second member and serving to limit relative angular displacement.

8. A resilient coupling comprising two concentric rotary elements; a substantially concentric arcuate spring connecting said members and deformable to permit relative displacement of said members in both angular directions; and means coacting with a portion of said spring to limit positively such displacements.

9. The combination with a drive shaft and a governor shaft alined therewith, of a yielding connection between the two comprising an arcuate spring substantially concentric with said shafts and deformable to permit relative displacement in both angular directions; and means coacting with the ends of the spring to limit positively such displacements.

In testimony whereof I have signed my name to this specification.

CLEMENT RUEGG.